United States Patent

Rausch

[11] Patent Number: 5,887,956
[45] Date of Patent: *Mar. 30, 1999

[54] HYDRAULIC BRAKE SYSTEM WITH SLIP CONTROL

[75] Inventor: Jurgen Rausch, Eschborn/TS, Germany

[73] Assignee: ITT Automotive Europe GmbH, Germany

[ * ] Notice: The term of this patent shall not extend beyond the expiration date of Pat. No. 5,683,150.

[21] Appl. No.: 619,745

[22] PCT Filed: Sep. 23, 1994

[86] PCT No.: PCT/EP94/03183

§ 371 Date: Mar. 28, 1996

§ 102(e) Date: Mar. 28, 1996

[87] PCT Pub. No.: WO95/09098

PCT Pub. Date: Apr. 6, 1995

[30] Foreign Application Priority Data

Sep. 28, 1993 [DE] Germany .......................... 43 32 820.2

[51] Int. Cl.⁶ .................................. B60T 8/36; B60T 8/50
[52] U.S. Cl. .................................... 303/119.2; 303/113.1; 303/900; 303/116.1; 251/117
[58] Field of Search .............................. 303/119.2, 119.1, 303/900, 901, 68, 116.1, 116.2, 113.1, 113.5, 186–189, 9.75, 9.62, 84.1, 84.2, 115.1–115.6, DIG. 1, DIG. 2, 10–12, 117.1, 119.3; 188/349; 137/495, 509, 596.17; 251/129.19

[56] References Cited

U.S. PATENT DOCUMENTS

| | | | |
|---|---|---|---|
| 3,826,542 | 7/1974 | Peruglia | 303/119.2 |
| 3,877,760 | 4/1975 | Cole et al. | 303/119.2 |
| 4,350,396 | 9/1982 | Mortimer | 303/119.2 |
| 4,668,024 | 5/1987 | Nakanishi et al. | 303/119.2 |
| 4,679,589 | 7/1987 | Inden et al. | 303/119.2 |
| 4,790,351 | 12/1988 | Kervagoret | 303/119.2 |
| 4,821,770 | 4/1989 | Parrott et al. | 303/119.2 |
| 4,844,119 | 7/1989 | Marthinic | 303/119.2 |
| 4,844,559 | 7/1989 | Harrison | 303/119.2 |
| 4,915,459 | 4/1990 | Hashida et al. | 303/119.2 |
| 5,076,538 | 12/1991 | Mohr et al. | 303/119.2 |
| 5,221,129 | 6/1993 | Takasaki | 303/119.2 |
| 5,356,211 | 10/1994 | Fritsch | 303/900 |
| 5,370,450 | 12/1994 | Volz et al. | 303/900 |
| 5,388,899 | 2/1995 | Volz et al. | 303/119.2 |
| 5,402,824 | 4/1995 | Hosoya et al. | 303/119.2 |
| 5,435,638 | 7/1995 | Bayliss | 303/119.2 |
| 5,445,447 | 8/1995 | Farr et al. | 303/900 |
| 5,468,059 | 11/1995 | Farr | 303/119.2 |
| 5,647,644 | 7/1997 | Volz et al. | 303/119.2 |
| 5,664,849 | 9/1997 | Burgdorf et al. | 303/900 |
| 5,683,150 | 11/1997 | Burgdorf et al. | 303/900 |
| 5,803,556 | 9/1998 | Weis et al. | 303/119.2 |

FOREIGN PATENT DOCUMENTS

| | | |
|---|---|---|
| 0317305 | 5/1989 | European Pat. Off. . |
| 0423755 | 4/1991 | European Pat. Off. . |
| 2591678 | 10/1986 | France . |
| 2680742 | 3/1993 | France . |
| 3437834 | 4/1986 | Germany . |
| 3836112 | 4/1990 | Germany . |
| 3934771 | 3/1991 | Germany . |
| 4010842 | 10/1991 | Germany . |
| 4112920 | 10/1992 | Germany . |
| 4137123 | 5/1993 | Germany . |
| 4141546 | 6/1993 | Germany . |
| 4211307 | 10/1993 | Germany . |
| 3427802 | 2/1985 | United Kingdom . |
| 2252140 | 7/1992 | United Kingdom . |
| WO 9118774 | 12/1991 | WIPO . |

OTHER PUBLICATIONS

English translation of the International Preliminary Examination Report for application No. PCT/EP94/03180.
Search Report of the German PatentOffice Application No. P4332820.2.

Primary Examiner—Douglas C. Butler
Attorney, Agent, or Firm—Rader, Fishman & Grauer PLLC

[57] ABSTRACT

The present invention relates to a slip-controlled brake system including digitally controlled electromagnetic inlet valves and outlet valves, and the inlet valve has a restrictor valve control responsive to differential pressures in order to minimize valve noises.

9 Claims, 4 Drawing Sheets

HYDRAULIC BRAKE SYSTEM WITH SLIP CONTROL

TECHNICAL FIELD

The present invention relates to hydraulic brake systems with slip control, and more particularly relates to hydraulic brake systems with slip control wherein the discontinuous pressure fluid control in the slip-controlled brake systems causes an undesirable sound emission due to the pulse-type pressure variation.

BACKGROUND OF THE INVENTION

It has been found in the brake system described in patent application Ser. No. 43 19 227 (not published) that the proposed constructive solutions with respect to the arrangement of the annular piston including a controllable restrictor and the details in the solenoid inlet valve, which correspond to the annular piston, require further structural simplification to achieve a most simple miniaturized inlet valve design.

A solenoid valve is disclosed in European patent application No. 0 317 305 which is suitable for use in anti-lock hydraulic brake systems. The solenoid valve has a magnetic core accommodating a coil. The magnetic core is confined by a magnetic armature on one side and by a restrictor member on the other side. The restrictor member has a passage which is closable by a valve needle. The restrictor member is compressed in an axially movable fashion between the magnetic core and a housing cover, in which the pressure fluid inlet is provided, so that in the switching position, where the valve needle closes off the supply duct in the restrictor member, a differential pressure acts on either side of the restrictor member and causes a displacement of the valve needle in relation to the magnetic armature. A compression spring interposed between the valve needle and the magnetic armature is preloaded thereby. The preloading force of the compression spring caused by the difference in pressure on the restrictor member results in a quick release of the magnetic armature from the magnetic core when the electromagnetic excitation is interrupted. This results in short valve opening times. A spring resetting force acting on the valve needle in the opening sense favors the quick opening of the supply duct in the restrictor member. Thus, pressure fluid propagates to an annular slot after having passed through the free passage at the valve needle. The annular slot is provided between the hollow-cylindrical inside wall of the magnetic core and the outside wall of a cylindrical part guiding the valve needle. The fluid which emanates from the valve inlet is conducted through the supply duct in the restrictor member and the subsequent annular slot into a pressure fluid connection which leads to the pressure fluid consumer.

While the circuit configuration of the brake system disclosed in the main application remains unmodified, an object of the present invention is to suggest solutions for miniaturizing the inlet valve which can be achieved at low cost without limiting the operability of the valve.

According to the present invention, this object is achieved by the annular piston, which accommodates the controllable restrictor, which is axially movable within an annular chamber in the valve carrier concentrically relative to the valve closure member of the inlet valve.

Thus, the annular chamber, which originally accommodates an annular filter and the valve closure member, additionally serves for the favorable integration of the annular piston, thereby permitting the external dimensions of the valve carrier and the dimensions of the stepped bore of the valve accommodating member to be maintained. Further, the annular portion between the valve accommodating member and the valve carrier can be used to position the annular filter. A favorable increase of the filter surface for filtering the fluid which, among others, flows between the wheel brake and the non-return cup seal is thereby achieved.

DETAILED DESCRIPTION OF THE PREFERRED EMBODIMENT

Figure 1:
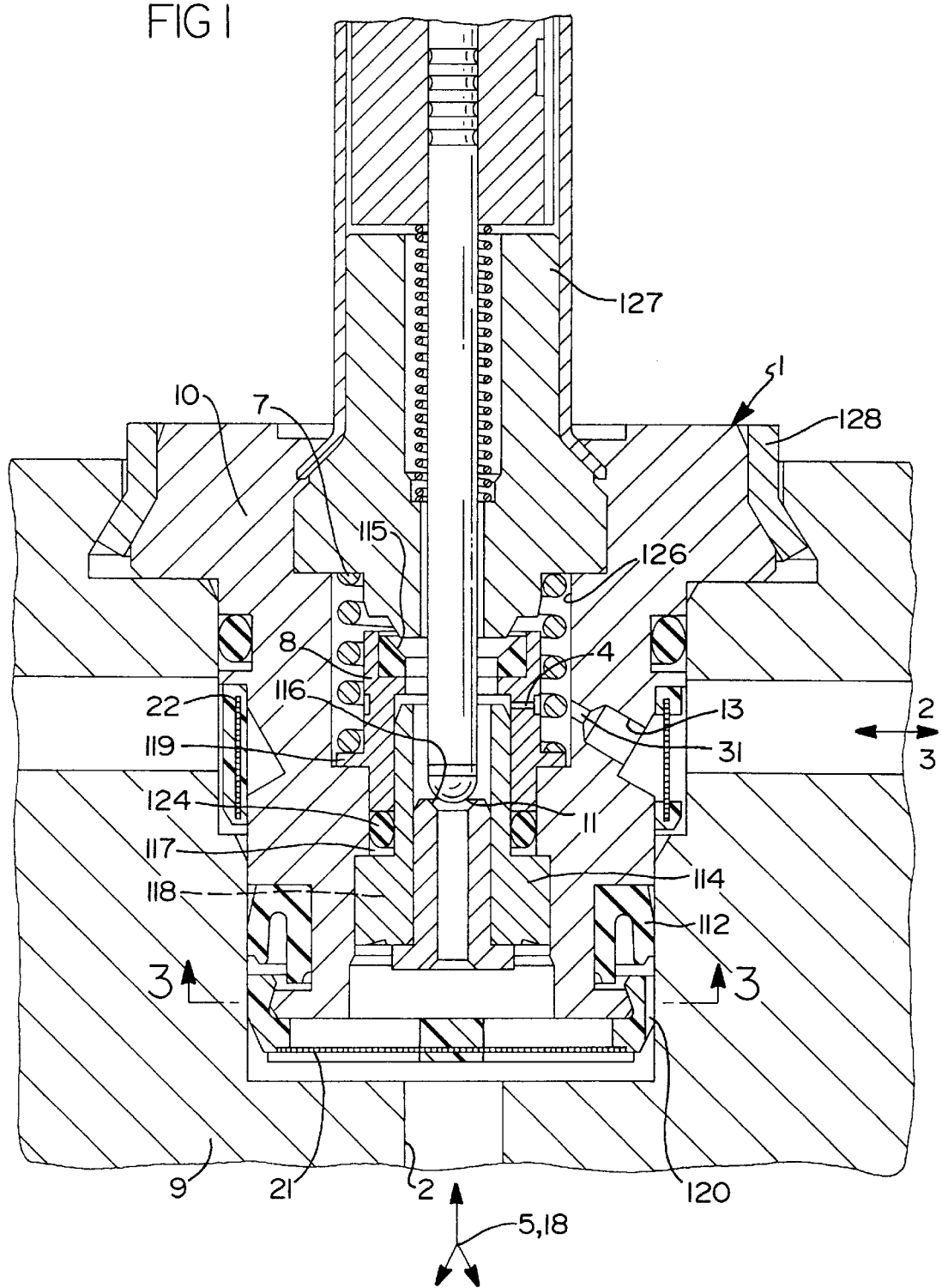
FIG. 1 is a partial view of an inlet valve on an enlarged scale, including the arrangement of the annular piston according to the present invention proximate the valve closure member.
Figure 1A:
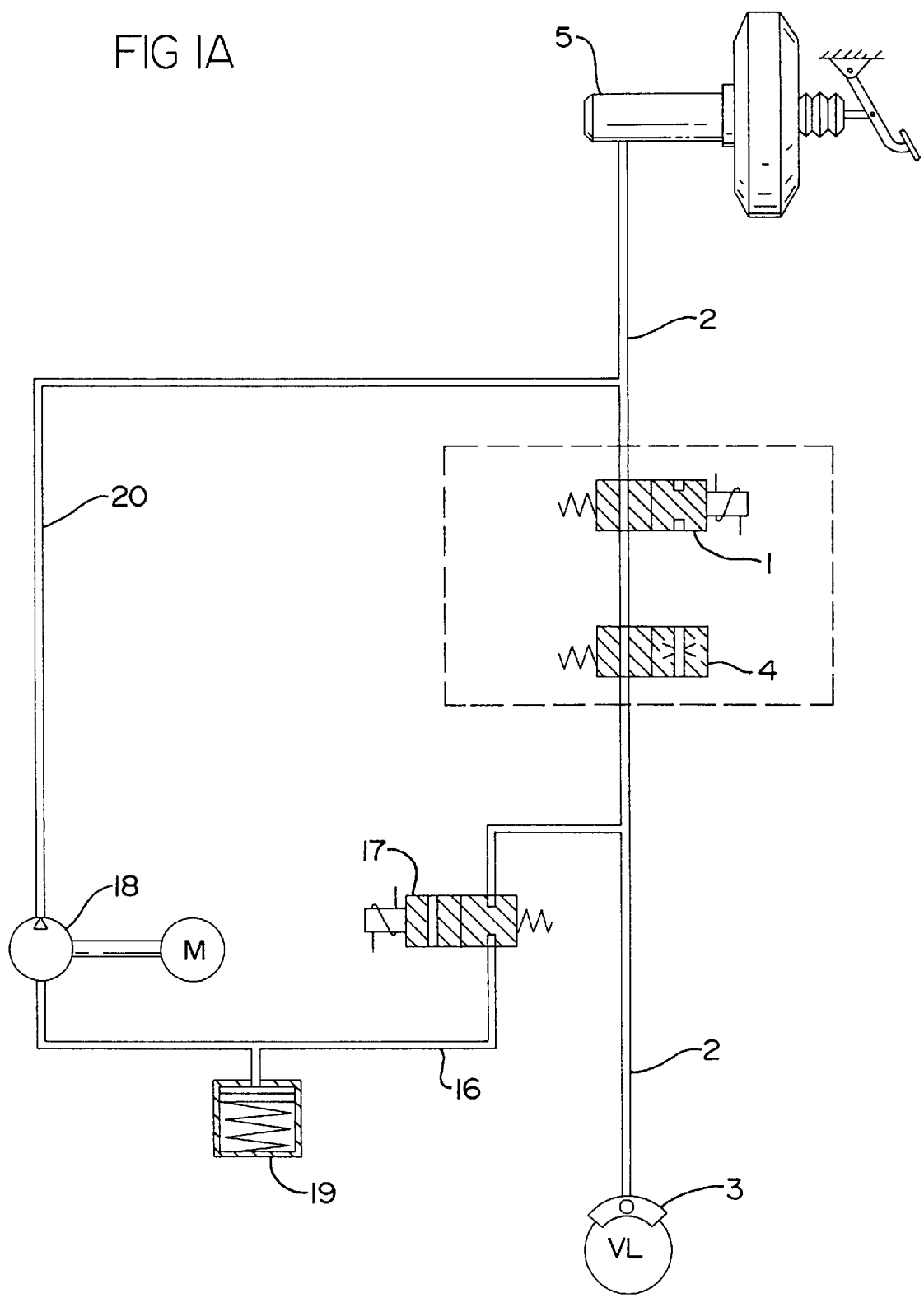
FIG. 1A is a schematic depiction of a hydraulic circuit which incorporates the inlet valve of the present invention.

FIGS. 1 and 1A show a constructive embodiment of the present invention with respect to the overall structure of an inlet valve 1. Inlet valve 1 comprises a valve carrier 10 which includes a valve closure member 11 and the ducting of a main pressure line 2 emanating from a braking pressure generator 5 and an auxiliary pressure pump 18. Valve carrier 10 is preferably integrated in a valve accommodating member 9 in a cartridge-type construction (as a screw-in cartridge, staked cartridge, cartridge with spreading ring). In the chosen illustration of the valve attachment system, the valve carrier 10 in the conically tapered outside portion is secured with a spreading ring 128 in the valve accommodating member 9. The opening in the valve accommodating member 9 has a conical undercut to receive the spreading ring 128. The valve carrier 10 is sealed in the valve accommodating member 9 by a seal which is arranged below the conically shaped valve carrier 10.

There is a pressure fluid connection (line 16,20) between the main pressure line 2, which is connected to the braking pressure generator 5 and the auxiliary pressure pump 18, and the annular piston 8 by way of a plate filter 21, which is snapped onto the extension of the valve carrier 10 and the normally open valve closure member 11. Line 16 also is in hydraulic communication with pressure fluid collection means 19 and outlet valve 17. Pressure fluid propagates from the annular piston 8 towards the annular filter 22, which is connected upstream of the connection to the wheel brake 3, through the open annular slot at a magnetic core 127 and also, to a small extent, through a restrictor 4 to an invariable orifice 31 machined in the valve carrier 10. The invariable orifice 31 is used to improve the ABS control quality.

A transverse bore in its wall permits the annular piston 8 to perform the controllable restrictor function. In an annular chamber 126, the annular piston 8 is axially movable on the extension of the rotationally symmetrical central element 114 including a valve seat 116, the extension being reduced in diameter. By the action of a compression spring 7, the annular piston 8 is supported with its external collar 119, acting as a stop, on the bore step of the annular chamber 126 in the valve carrier 10. Substantially, the annular piston 8 takes the shape of a sleeve which, at its front surface close to the magnetic core 127, has a funnel-shaped rubber sealing seat 115 which is opposed to the conical frontal end of the magnetic core 127. Upon request or requirement, the conical sealing can also be provided by a metallic flat seal or an O-ring embedded in the front surface area of the annular piston 8.

A sealing ring 124 is provided on the frontal end of the annular piston 8 remote from the magnetic core 127. Sealing ring 124 prevents an escape flow of pressure fluid from the braking pressure generator 5 in the direction of the wheel brake 3 in the closed condition of the inlet valve 1. The rotationally symmetric central element 114, which projects with its extension into the interior, is press fitted in the stepped bore of the valve carrier 10 and, if necessary, staked in the frontal end area. In the embodiment shown, the valve seat 116 is a stepped sleeve part and is press fitted in the bore of the central element 114 which extends coaxially relative to the valve closure member 11.

An annular groove, which is positioned on the outside periphery of the valve carrier 10 at the level of the central element 114, accommodates a sealing cup 112 which shuts off fluid flow in the direction of the wheel brake 3. The sealing cup 112 permits a pressure fluid connection, filtering the fluid, between the wheel brake 3 and the braking pressure generator 5 or the auxiliary pressure pump 18. The pressure fluid connection is established by way of an annular filter 22, spaced between the valve carrier 10 and the valve accommodating member 9, and at least one lateral recess 120 at the plate filter 21, which can be seen in the drawing.

Figure 2:
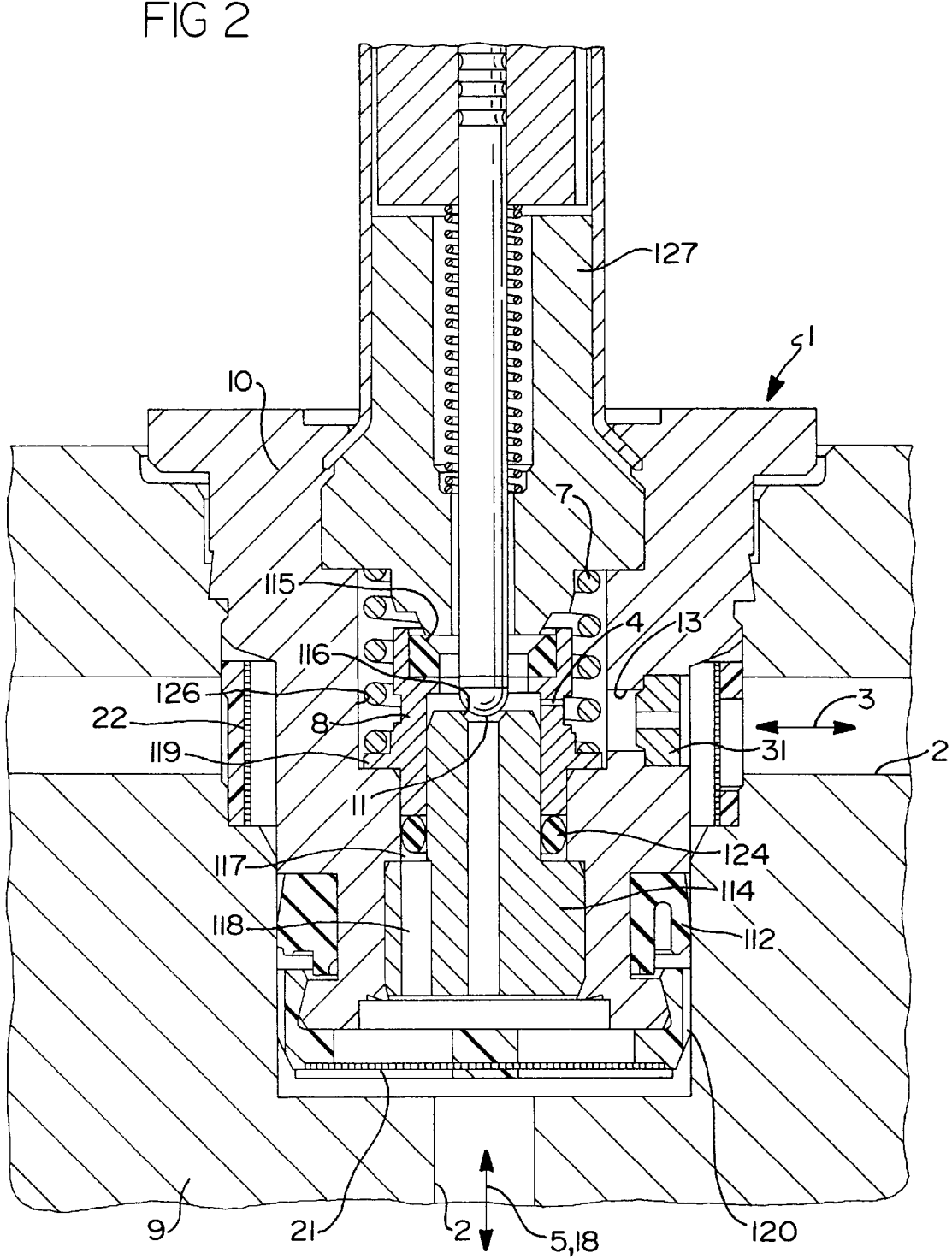
FIG. 2 is a second embodiment of the present invention.

In contrast to the embodiment of FIG. 1, FIG. 2 shows (also on a considerably enlarged scale) the valve seat 116 integrated as a homogeneous component in the central element 114. This obviates the need for the separate arrangement of another sleeve-shaped press-in part including the valve seat 116, as explained in the embodiment of FIG. 1. To pressurize the sealing ring 124 provided on the annular piston 8, the central element 114 has only one aperture 118 that is dimensioned correspondingly large and permits low-cost manufacture as a bore. To exactly adjust the quantity of fluid flow to the wheel brake 3 during ABS control operations, an invariable orifice 31 in the valve carrier 10 is additionally press fitted as an insert member in the transverse bore 13 of the valve carrier 10. Transverse bore 13 hydraulically connects the annular chamber 126 to the wheel brake 3. If necessary, the function of the invariable orifice is possible also by a calibrated fine boring of the transverse bore, as shown in the embodiment of FIG. 1. The valve carrier 10 is retained by a self-shearing attachment in the valve accommodating member 9, so that the sealing ring known from FIG. 1 can be eliminated.

All other elements, which can be seen in the illustration of the embodiment of FIG. 2, are substantially identical with the design and function in FIG. 1.

Figure 3:
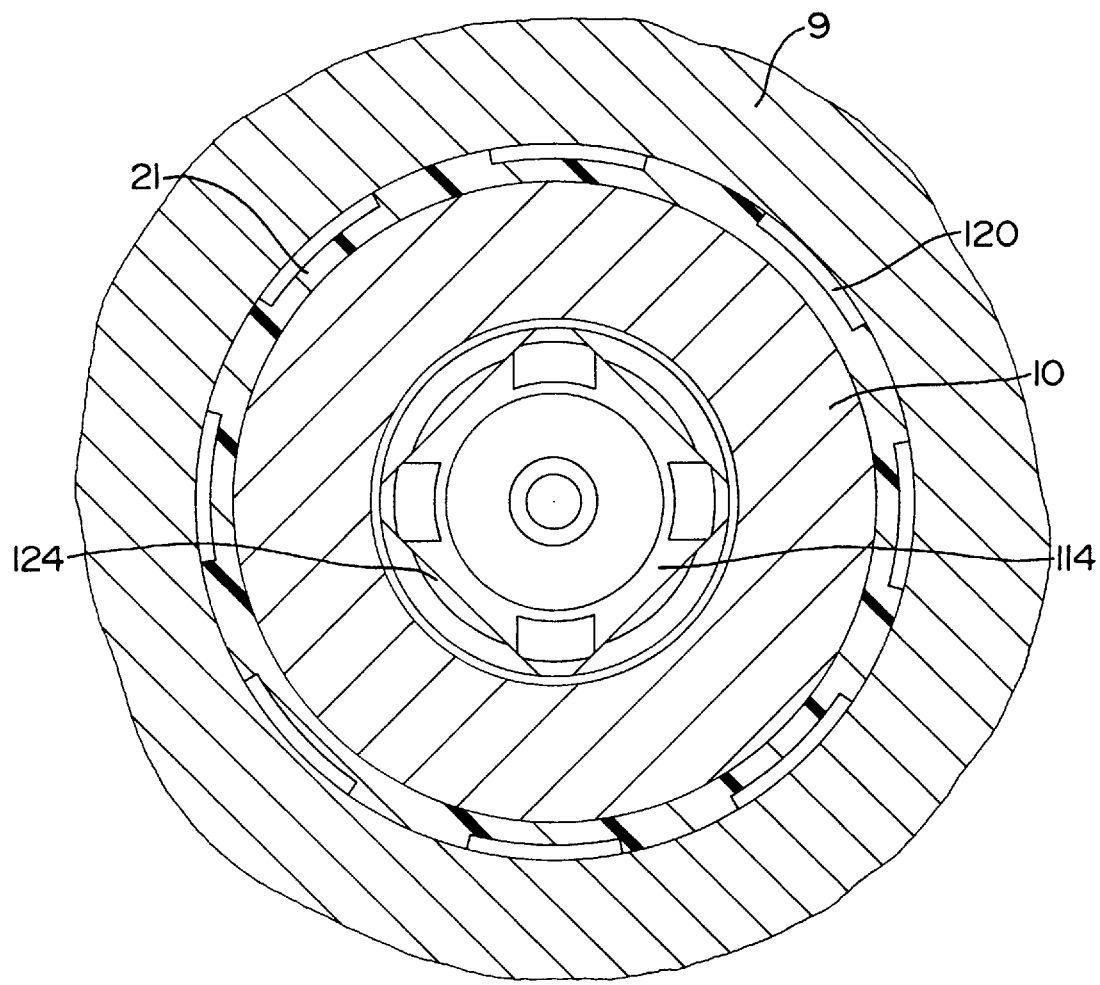
FIG. 3 is a cross-section view taken along the line of intersection A—A of the valve carrier on an enlarged scale.

FIG. 3 shows a top view of the inlet valve 1 shown in FIGS. 1 and 1A, taken along the line of intersection A—A. The view shows that the central element 114, because of its square-section design, provides correspondingly large pressure fluid passages with respect to the inside wall of the valve carrier 10 in the direction of the sealing ring 124 which precedes the annular piston 8. The cross-sectional plane extends through the bottom end portion of the valve carrier 10 onto which the plate filter 21 is snapped. Spread over the periphery of the plate filter 21 are several recesses 120 which provide a pressure fluid passage from the direction of the sealing cup 112. Thus, all elements described with respect to the cross-sectional plane A—A have a rotationally symmetrical coaxial arrangement relative to each other.

The operation of the present invention will be explained in the following.

During an uncontrolled slip-free normal braking mode, the inlet valve 1 adopts its electromagnetically non-excited open initial position. When the braking pressure generator 5 is operated, pressure will not accumulate at the inlet of the inlet valve 1 because the valve seat 116 has no considerable throttling or restricting effect. A considerable difference in pressure between the valve inlet and valve outlet is thereby prevented. The annular piston 8 remains in abutment on the bore step in the initial position shown in the drawing, so that braking pressure can be applied to the wheel brake 3 by way of the valve seat 116 and the annular slot between the annular piston 8 and the magnetic core 127.

When the brake pedal is released, the braking pressure decreases again in the opposite direction towards the braking pressure generator 5 by way of the open valve closure member 11 and the sealing cup 112.

When the inlet valve 1 is closed and the difference in pressure between the valve inlet (master cylinder pressure/ pump pressure) and the valve outlet (wheel braking pressure) exceeds a value adjusted by the compression spring 7 during a brake slip control operation, the resultant pressure force on the sealing ring 124 causes the annular piston 8 to displace in opposition to the spring force and to move into sealing abutment on the magnetic core 127. Thus, there is a pressure fluid connection to the wheel brake 3 exclusively by way of the restrictor 4 of the annular piston 8. When the inlet valve 1 reopens its regular passage by way of the valve closure member 11, the fluid replenished by the auxiliary pressure pump 18 in operation propagates to the wheel brake exclusively by way of the restrictor 4 in the annular piston 8 and is slowed down such that the pressure surge and, thus, the noise is reduced during subsequent repeated closing operations of the inlet valve 1. When the switching pressure differential necessary for the actuation of the annular piston 8 falls short of and the braking operation is interrupted, the annular piston 8 returns to its initial position where the passage cross-section is increased.

I claim:

1. Hydraulic brake system with slip control, of the type including a braking pressure generator which is hydraulically connected to at least one wheel brake by way of a main pressure line, a return line connected to said at least one wheel brake and to a pressure fluid collecting means, an auxiliary pressure pump having an auxiliary pressure line hydraulically connected to the braking pressure generator, inlet valves and outlet valves inserted in the main pressure line and the return line, a controllable restrictor inserted in the main pressure line between the inlet valve and the wheel brake which establishes an unimpeded hydraulic fluid passage in the main pressure line to said at least one wheel brake in a first switched position and limits the pressure fluid passage to the wheel brake in another switched position, comprising:

a valve accommodating member;

a valve carrier being received in said valve accommodating member and having an annular chamber therein;

an annular piston being received in said annular chamber of said valve carrier and being axially movable relative to said chamber, wherein said annular piston accommodates said controllable restrictor; and a closure member for said inlet valve also being received within said valve carrier.

2. Hydraulic brake system as claimed in claim 1, wherein the annular chamber includes a stepped bore which is confined by a magnetic core of the inlet valve on a first frontal end of said magnetic core and by a central element accommodating a valve seat on a second frontal end.

3. Hydraulic brake system as claimed in claim 2, wherein a front surface of the annular piston proximate to the magnetic core has a sealing seat that is movable into abutment on a frontal end of the magnetic core.

4. Hydraulic brake system as claimed in claim 2, wherein the annular piston has a collar which is positioned on the stepped bore of the annular chamber and supported on a compression spring mounted on the magnetic core.

5. Hydraulic brake system as claimed in claim 1, wherein the annular piston is guided between a central element including a valve seat and a wall of the annular chamber.

6. Hydraulic brake system as claimed in claim 5, wherein an intermediate space to accomodate a sealing ring is provided between a front surface of the central element and a front surface of the annular piston proximate to the central element.

7. Hydraulic brake system as claimed in claim 6, wherein the central element has at least one aperture having an axis in the direction of its axis of symmetry which establishes a permanent pressure fluid connection between the main pressure line extending from the direction of the braking pressure generator and the intermediate space accommodating the sealing ring.

8. Hydraulic brake system as claimed in claim 1, wherein said closure member is received in said annular chamber of said valve carrier for selective contact with a valve seat.

9. Hydraulic brake system as claimed in claim 1, wherein said controllable restrictor is a bore located in said annular piston.

* * * * *